(12) United States Patent
Dudar

(10) Patent No.: US 11,168,648 B2
(45) Date of Patent: Nov. 9, 2021

(54) SYSTEMS AND METHODS FOR VEHICLE FUEL SYSTEM AND EVAPORATIVE EMISSIONS SYSTEM DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 16/430,282

(22) Filed: Jun. 3, 2019

(65) Prior Publication Data

US 2020/0378345 A1 Dec. 3, 2020

(51) Int. Cl.
| | |
|---|---|
| *F02M 25/08* | (2006.01) |
| *B60K 15/03* | (2006.01) |
| *B60K 6/22* | (2007.10) |
| *B60K 15/035* | (2006.01) |
| *B60W 20/00* | (2016.01) |

(52) U.S. Cl.
CPC ......... *F02M 25/0818* (2013.01); *B60K 6/22* (2013.01); *B60K 15/03* (2013.01); *B60K 15/03504* (2013.01); *B60K 15/03519* (2013.01); *F02M 25/089* (2013.01); *B60K 2015/0319* (2013.01); *B60K 2015/03256* (2013.01); *B60K 2015/03514* (2013.01); *B60W 20/00* (2013.01); *B60Y 2200/92* (2013.01); *B60Y 2300/47* (2013.01)

(58) Field of Classification Search
CPC .. F02M 25/0818; F02M 25/089; B60K 15/03; B60K 6/22; B60K 15/03519; B60K 15/03504; B60K 2015/03514; B60K 2015/0319; B60K 15/035
See application file for complete search history.

(56) References Cited

U.S. PATENT DOCUMENTS

| | | | |
|---|---|---|---|
| 4,379,681 A | 4/1983 | Goudy, Jr. | |
| 5,333,590 A | 8/1994 | Thomson | |
| 6,016,690 A | 1/2000 | Cook et al. | |
| 6,164,123 A | 12/2000 | Corkill | |
| 6,557,401 B2 | 5/2003 | Ito | |
| 6,764,286 B2 | 7/2004 | Hunnicutt et al. | |
| 9,341,538 B2 * | 5/2016 | Horiba | G01M 3/2876 |
| 9,669,705 B2 | 6/2017 | Pearce et al. | |
| 2014/0026992 A1 | 1/2014 | Pearce et al. | |
| 2014/0069394 A1 | 3/2014 | Jentz et al. | |
| 2015/0159597 A1 | 6/2015 | Woods et al. | |
| 2015/0211449 A1 * | 7/2015 | Woods | F02M 25/089 123/495 |
| 2015/0308389 A1 | 10/2015 | Bolger et al. | |

(Continued)

OTHER PUBLICATIONS

Dudar, A., "Systems and Methods for Reducing Vehicle Emissions," U.S. Appl. No. 15/936,012, filed Mar. 26, 2018, 70 pages.

(Continued)

*Primary Examiner* — Xiao En Mo
(74) *Attorney, Agent, or Firm* — Geoffrey Brumbaugh; McCoy Russell LLP

(57) ABSTRACT

Methods and systems are provided for a fuel system of a hybrid vehicle. In one example, a system may include a fuel tank selectively fluidly coupled to a fuel vapor canister via a first conduit that includes a fuel tank isolation valve and via a second conduit that includes a tank pressure control valve and a pump. In one example, the pump is a vacuum pump.

15 Claims, 7 Drawing Sheets

(56) References Cited

U.S. PATENT DOCUMENTS

| | | |
|---|---|---|
| 2016/0298579 A1* | 10/2016 | Peters .................... F02M 25/08 |
| 2017/0030303 A1* | 2/2017 | Takakura ......... B60K 15/03504 |
| 2017/0114733 A1 | 4/2017 | Aghili et al. |
| 2018/0195445 A1* | 7/2018 | Iriyama ............... F02M 25/0836 |
| 2019/0032613 A1* | 1/2019 | Miyabe ................ F02M 25/089 |
| 2019/0186392 A1 | 6/2019 | Dudar et al. |
| 2019/0186422 A1 | 6/2019 | Dudar et al. |

OTHER PUBLICATIONS

Dudar, A. et al., "Systems and Methods for Onboard Canister Purge Valve Flow Mapping," U.S. Appl. No. 15/987,028, filed May 23, 2018, 130 pages.

Dudar, A., "Systems and Methods for Onboard Canister Purge Valve Flow Mapping," U.S. Appl. No. 15/987,046, filed May 23, 2018, 130 pages.

* cited by examiner

SYSTEMS AND METHODS FOR VEHICLE FUEL SYSTEM AND EVAPORATIVE EMISSIONS SYSTEM DIAGNOSTICS

FIELD

The present description relates generally to diagnosing a presence or absence of undesired evaporative emissions stemming from a fuel system and/or evaporative emissions system of a vehicle.

BACKGROUND/SUMMARY

Vehicle evaporative emissions control systems may be configured to store fuel vapors from fuel tank refueling and diurnal engine operations, and then purge the stored vapors during a subsequent engine operation. The fuel vapors may be stored in a fuel vapor canister, for example. In an effort to meet stringent federal emissions regulations, emission control systems may need to be intermittently diagnosed for the presence of leaks that could release fuel vapors to the atmosphere.

One method of testing for the presence of undesired evaporative emissions in an emission control system may include applying a vacuum to a fuel system and/or evaporative emissions that is otherwise sealed. An absence of gross undesired evaporative emissions may be indicated if a threshold vacuum is met. In some examples, the fuel system may be sealed subsequent to the threshold vacuum being reached, and an absence of non-gross undesired evaporative emissions may be indicated if a pressure bleed-up is less than a bleed-up threshold, or if a rate of pressure bleed-up is less than a bleed-up rate threshold. Failure to meet these criteria may indicate the presence of non-gross undesired evaporative emissions in the fuel system and/or evaporative emissions system. In some examples, an intake manifold vacuum may be used as the vacuum source applied to the emissions control system. However, hybrid-electric vehicles (HEVs) may have limited engine run time, and may thus have limited opportunities to perform such a test. Further, in order to improve fuel efficiency, vehicles may be configured to operate with a low manifold vacuum, and may thus have limited opportunities with sufficient vacuum to perform such tests for undesired evaporative emissions.

To overcome such issues, previous examples of solutions include evacuating a fuel system and evaporative emissions system via a vacuum pump positioned in a vent line stemming from a fuel vapor storage canister positioned in the evaporative emissions system. In one example, a vacuum pump is included in a vacuum pump conduit stemming from the vent line, the vacuum pump conduit in parallel with a canister ventilation valve (CVV). Such an arrangement may enable the vacuum pump to route fluid flow around the CVV. The vacuum pump conduit may comprise a check valve for sealing the vacuum pump conduit from the vent line when the vacuum pump is off, which may enable diagnostic routines such as tests for presence or absence of undesired evaporative emissions that rely on a sealed fuel system and/or evaporative emissions system.

However, the inventors have identified one or more issues with the previous example. For example, inclusion of the check valve increases costs and weight. Secondly, a vacuum pump positioned in the vent line may not effectively assist in fuel tank depressurization routines during engine operation. For example, during engine operation there may be times when fuel tank pressure is such that it may be desirable to relieve the pressure, and route fuel vapors emanating from the fuel tank to engine intake for combustion. Due to the above-mentioned issues related to low engine vacuum situations, it may be desirable to assist fuel tank depressurization via another element such as a vacuum pump, however a vacuum pump positioned in the vent line of the evaporative emissions system may draw fuel vapors in the direction of the vent line, rather than to engine intake. The inventors herein have recognized the above-mentioned issues.

In one example, the issues described above may be addressed by a system comprising a first conduit fluidly coupling a fuel tank to a fuel vapor canister and a second conduit fluidly coupling the fuel tank to the fuel vapor canister, wherein the first conduit comprises a fuel tank isolation valve and the second conduit comprises a tank pressure control valve and a vacuum pump. In this way, the vacuum pump may be used to assist in depressurizing the fuel tank under certain conditions including but not limited to low engine manifold vacuum.

As one example, the fuel vapor canister is selectively fluidly coupled to an ambient atmosphere via a vent line comprising a canister ventilation valve. During a diagnostic test, such as a first example of a test where it is desired to monitor an undesired emission from the vent line, the vacuum pump may be activated and each of the fuel tank isolation valve and the tank pressure control valve are closed. The canister ventilation valve is opened to flow air from the second conduit to an ambient atmosphere. The vacuum pump may remain active until an initial vacuum in the second conduit is reached. In response to the initial vacuum being reached, the vacuum pump may be deactivated and the canister ventilation valve may be closed, to equilibrate the vent line with the second conduit. As such, the vacuum in the second conduit may decrease and the vacuum in the vent line may increase until the two vacuums are equal to an equilibration threshold, wherein the equilibration threshold corresponds to a vacuum weaker than a vacuum of the initial threshold. By doing this, a valve may be eliminated in the arrangement to conduct the diagnostic test to monitor for undesired emissions, thereby decreasing manufacturing costs. Furthermore, the arrangement of the vacuum pump may enable the hybrid vehicle to decrease its dependency on the manifold vacuum to depressurize the fuel tank when desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
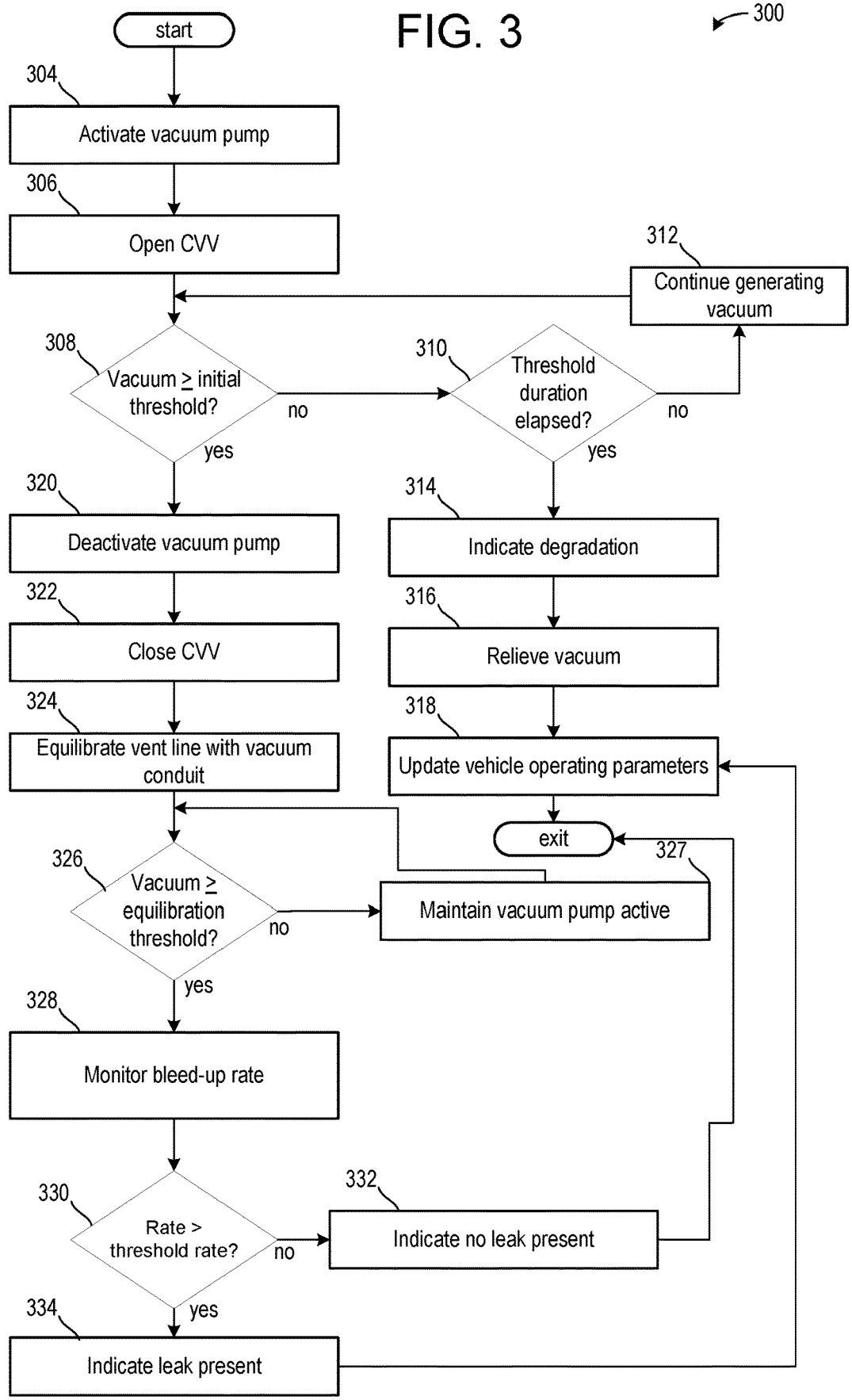
FIG. 3 illustrates a method for conducting a vacuum based test for the presence or absence of undesired evaporative emissions.
Figure 4:
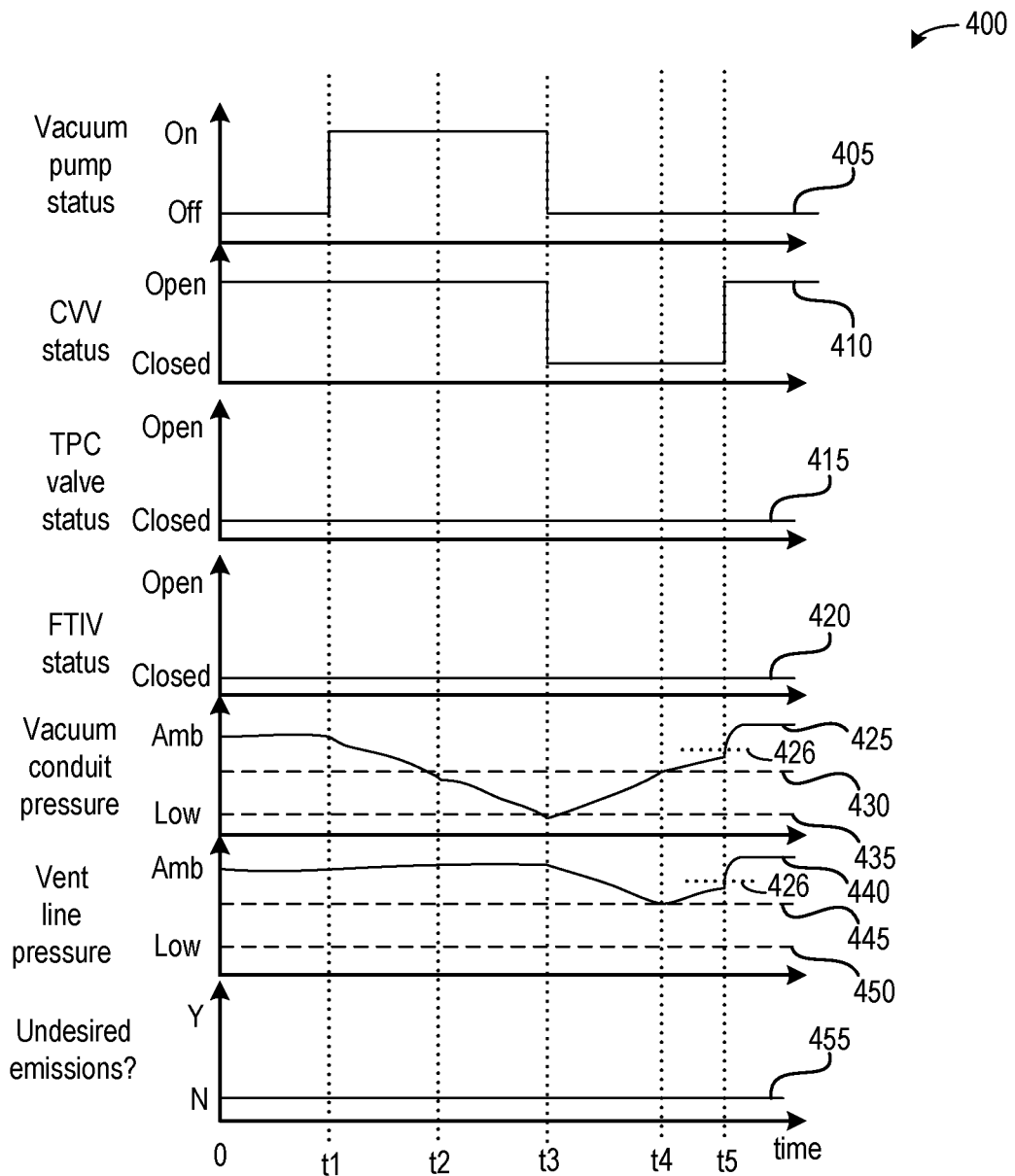
FIG. 4 illustrates a prophetic example timeline for conducting a vacuum-based test for undesired evaporative emissions.
Figure 5:
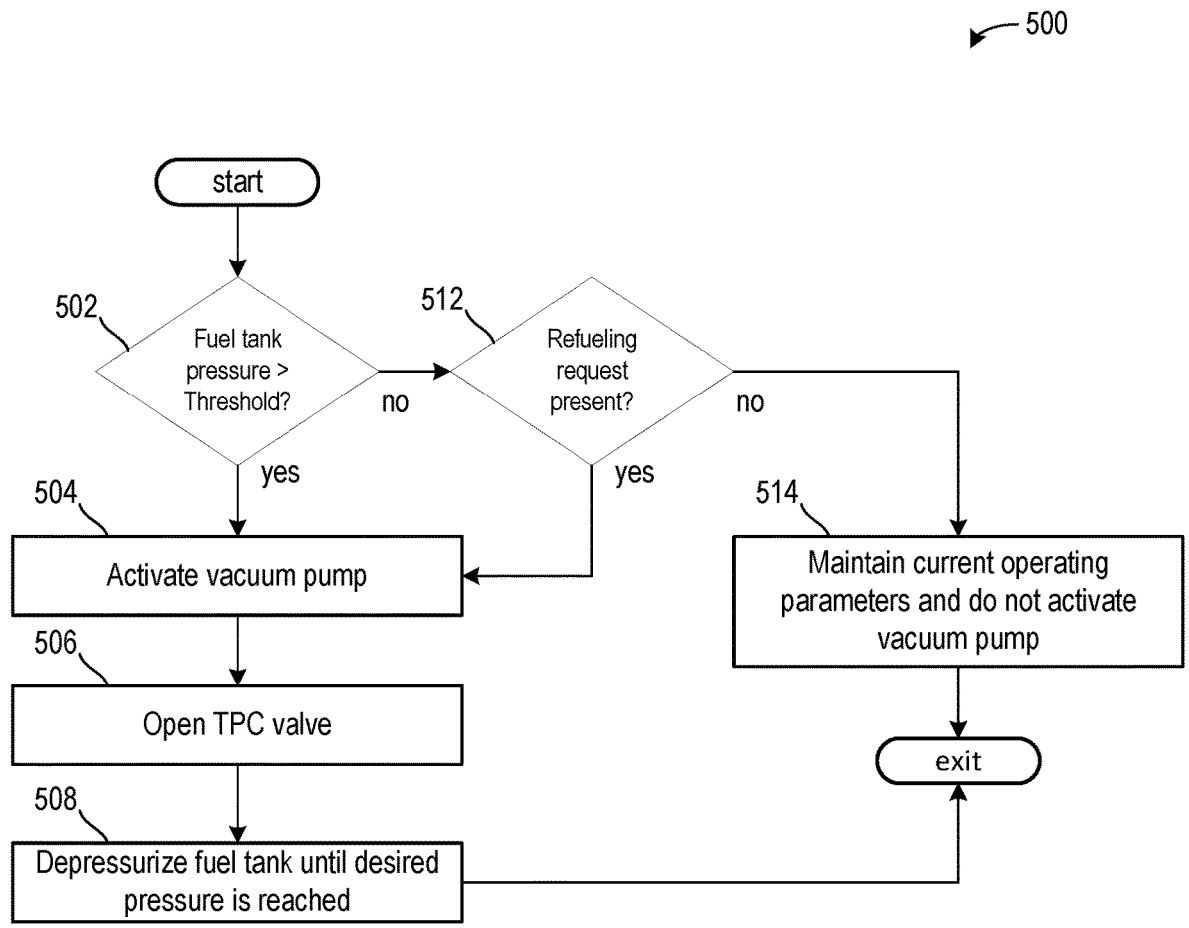
FIG. 5 illustrates a method for conducting a vacuum to depressurize a fuel tank.
Figure 6A:
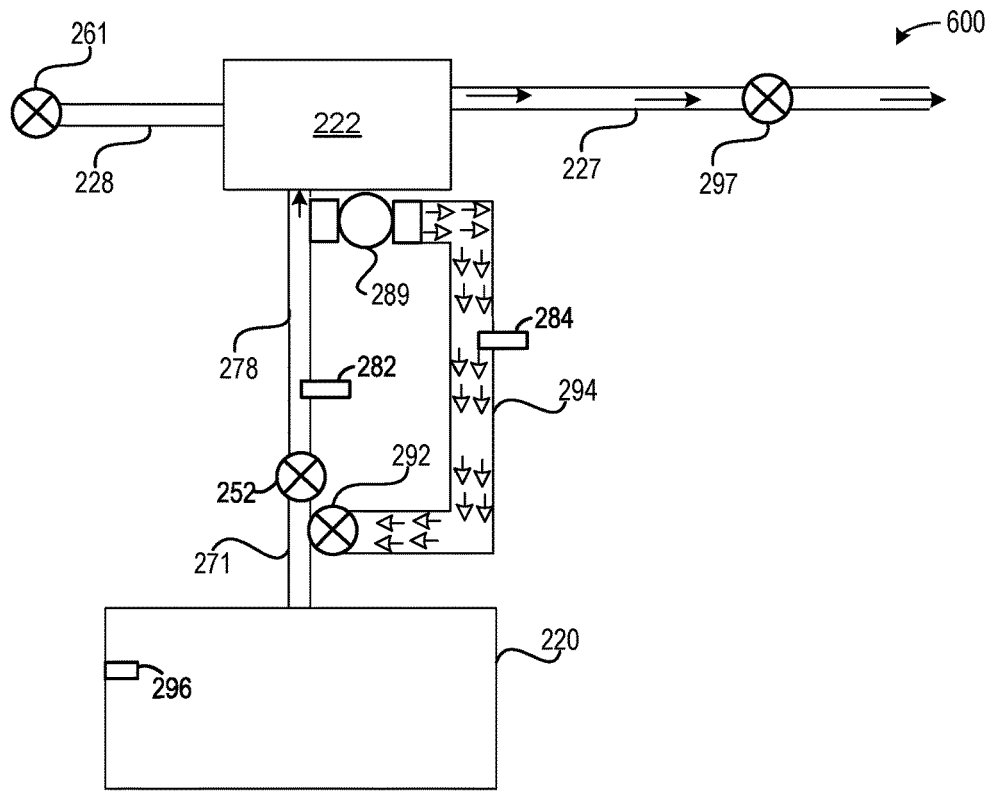
FIGS. 6A and 6B illustrate an initial state and an equilibration state of a fuel system undergoing a first example of the vacuum based test.
Figure 6B:
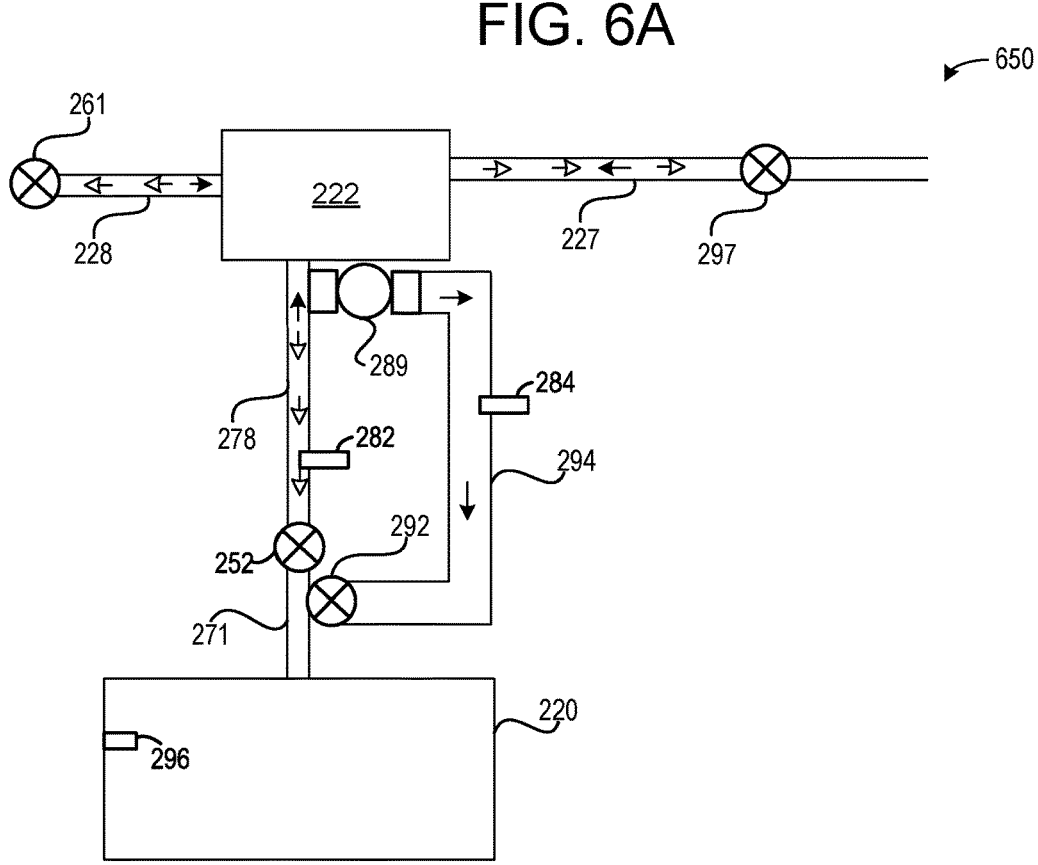
Figure 7A:
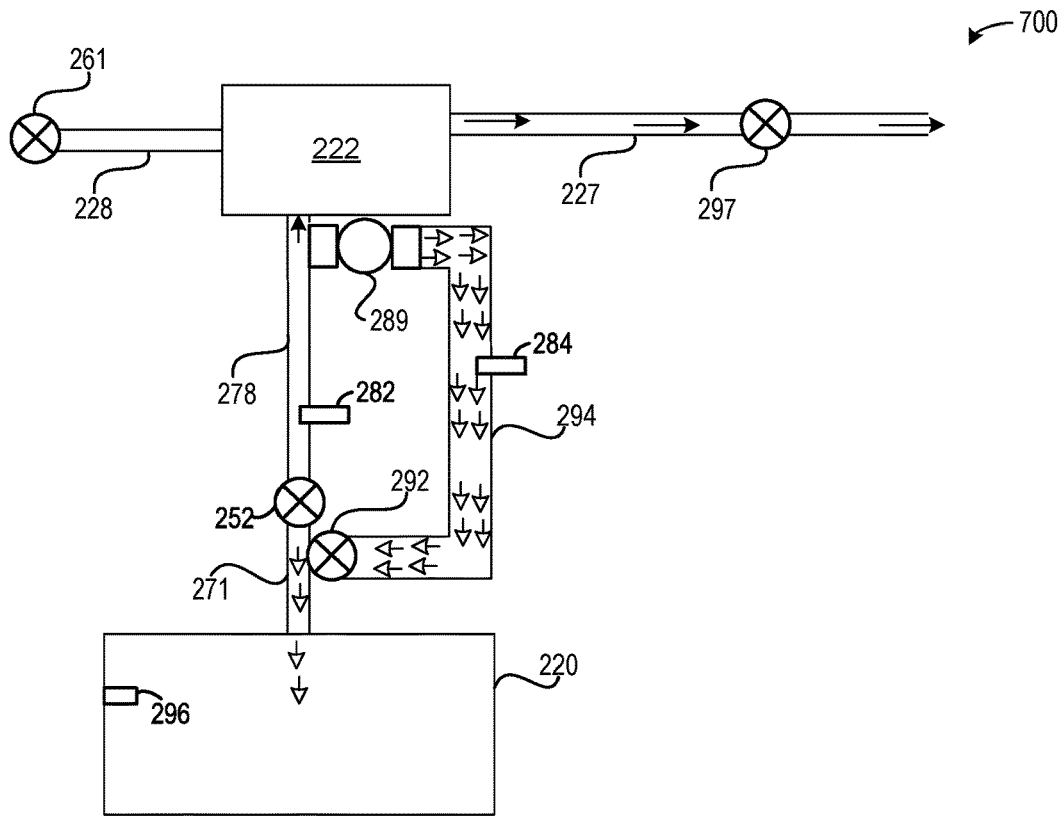
FIGS. 7A and 7B illustrate an initial state and an equilibration state of a fuel system undergoing a second example of the vacuum based test.
Figure 7B:
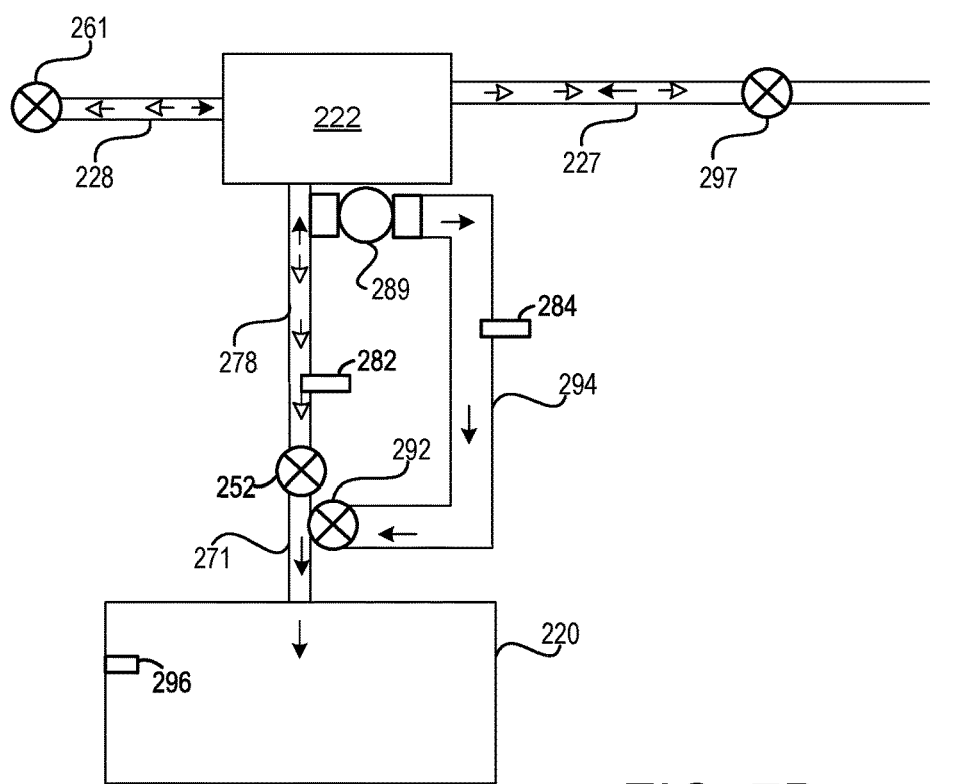

The following description relates to systems and methods for conducting tests for the presence or absence of undesired evaporative emissions stemming from a vehicle fuel system and/or evaporative emissions system. Such methods may be particularly relevant to hybrid vehicles, such as the vehicle system depicted in FIG. 1 with limited engine run-time and thus limited opportunities to purge a fuel vapor storage canister, shown in FIG. 2. A method for evacuating the fuel system to a desired vacuum level via a vacuum pump, in order to conduct a pressure bleed-up test for the presence or absence of non-gross undesired evaporative emissions is shown in FIG. 3. In some examples, the desired vacuum level may be a variable target based on data stored in a 3D look-up table as a function of ambient temperature and a canister loading state. FIG. 4 depicts an example timeline for conducting the evaporative leak test of FIG. 3. FIG. 5 illustrates a method for conducting a vacuum to depressurize a fuel tank. FIGS. 6A and 6B illustrate an initial state and an equilibration state of a fuel system undergoing a first example of the vacuum based test. FIGS. 7A and 7B illustrate an initial state and an equilibration state of a fuel system undergoing a second example of the vacuum based test.

FIGS. 1, 2, and 6A-7B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
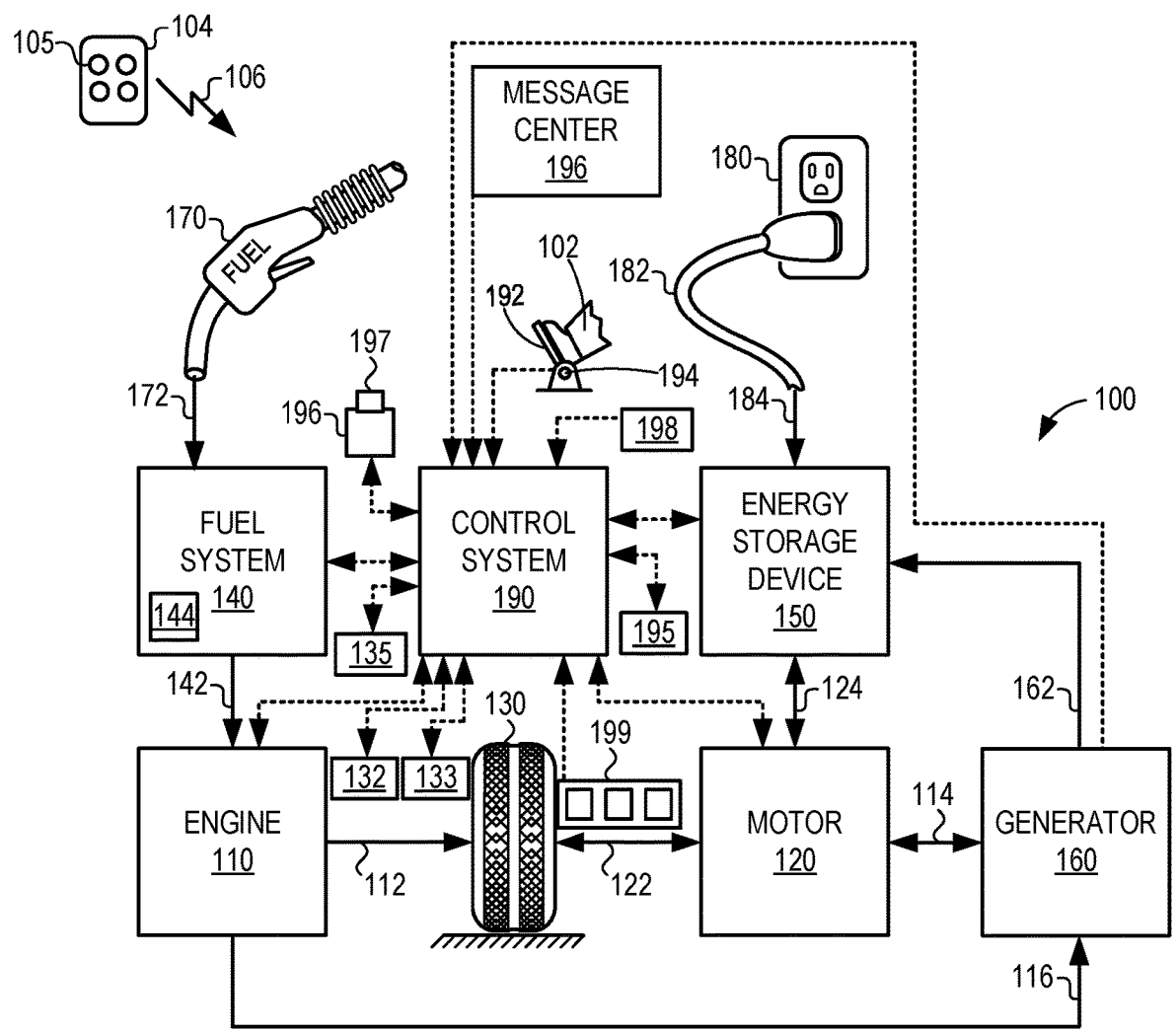
FIG. 1 shows a high-level block diagram illustrating an example vehicle system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be automatically actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

Figure 2:
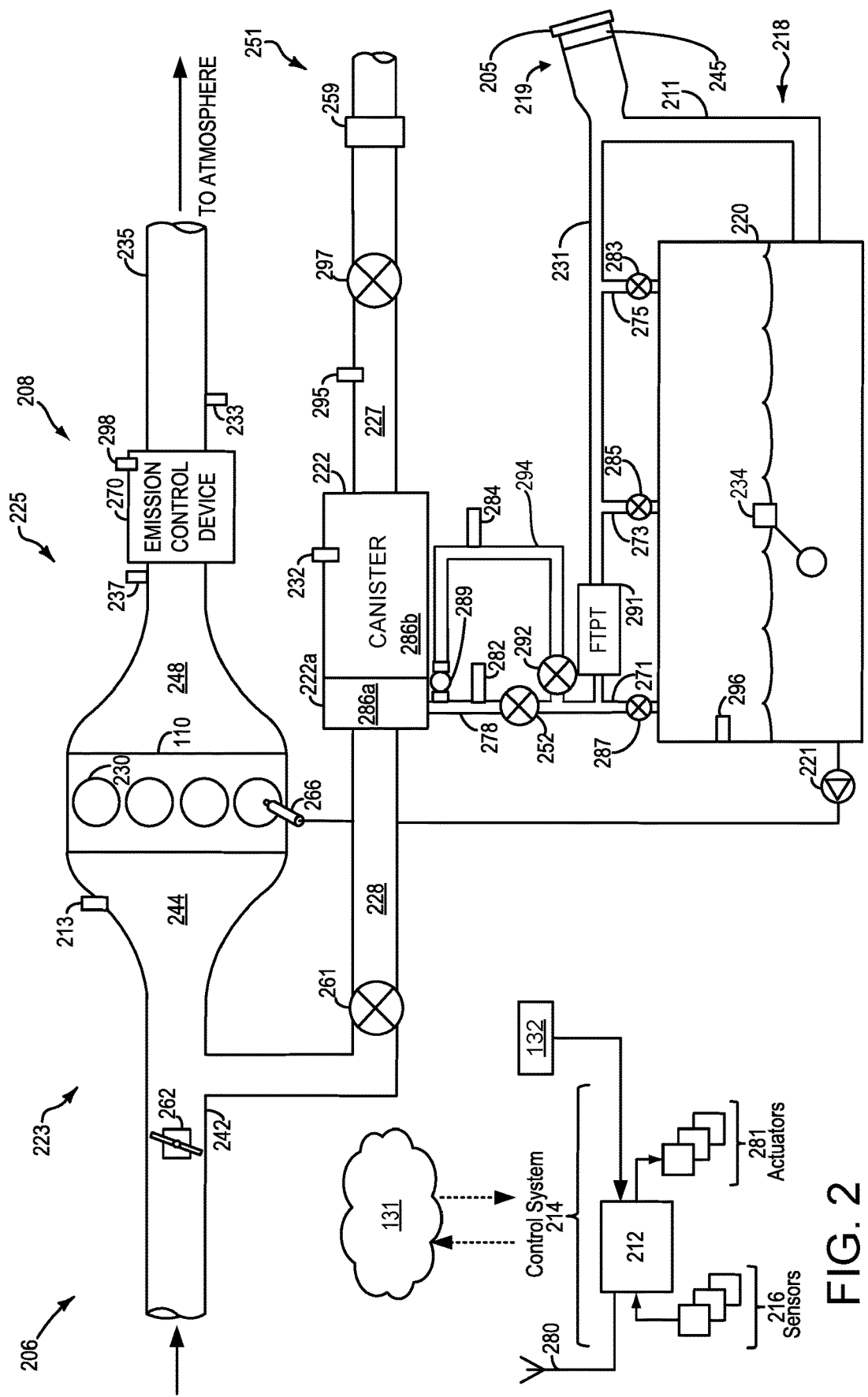
FIG. 2 schematically shows an example vehicle system with a fuel system and an evaporative emissions system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (evaporative emissions system) 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle equipped with an engine and not a motor that can operate to at least partially propel the vehicle, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. In an example, fuel tank 220 comprises a steel fuel tank. In some examples, the fuel system may include a fuel tank temperature sensor 296 for measuring or inferring a fuel temperature. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system (referred to herein as evaporative emissions system) 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222, as discussed. The fuel vapor canisters may be filled with an appropriate adsorbent 286*b*, such that the canisters are configured to temporarily trap fuel vapors (including vaporized hydrocarbons) during fuel tank refilling operations and during diagnostic routines, as will be discussed in detail below. In one example, the adsorbent 286*b* used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227 between the air filter 259 and the canister 222. When included, the canister vent valve 297 may be a normally open valve, so that fuel tank isolation valve 252 (FTIV, interchangeably referred to as FTIV 252 and isolation valve 252) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere via the canister vent valve 297, or purged to engine intake system 223 via canister purge valve 261.

In some examples, vent line 227 may include a hydrocarbon sensor 295. Such a hydrocarbon sensor may be configured to monitor for a presence of hydrocarbons in the vent line 227, and if detected, mitigating actions may be undertaken to block undesired bleed-emissions from reaching atmosphere.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In some examples, purging may include additionally commanding open the FTIV 252, such that fuel vapors from the fuel tank may additionally be drawn into the engine for combustion.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, pressure sensor 284, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 1.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine following a duration after the vehicle-off event. The controller may have a wake input that allows the controller to be returned to an awake mode based on an input received from one or more sensors, or via expiration of a timer set such that when the timer expires the controller is returned to the awake mode. In some examples, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown after a drive cycle. However, for a hybrid vehicle application, there may be limited engine run time, which may result in situations where EONV tests may not be robust due to a lack of heat rejection from the engine to the fuel tank. Similarly, evaporative emissions detection routines may be performed while the engine is running by using engine intake manifold vacuum to evacuate the evaporative emissions system and/or fuel system, but such opportunities may be sparse in a hybrid vehicle application.

Thus, undesired evaporative emissions detection routines may in some examples include a pump, such as a vacuum pump. However, as discussed above, placement of a vacuum pump in the vent line may be ineffective for use in assisting with fuel tank depressurization routines. Thus, as discussed herein, vacuum pump 289 may be configured in a vacuum pump conduit 294 which may be used for conducting undesired evaporative emissions routines and/or assisting in fuel tank depressurization routines. The vacuum pump 289 may comprise a rotary vane pump, a diaphragm pump, a liquid ring pump, a piston pump, a scroll pump, a screw pump, a wankel pump, etc., and may be understood to be in parallel with the FTIV 252.

The vacuum pump conduit 294 may be configured to route fluid flow (e.g., air and/or fuel vapor) from conduit 271 at a position between FTIV 252 and the fuel tank, around FTIV 252, and back to conduit 278 at a position between FTIV 252 and canister 222. Herein, conduit 278 may be interchangeably referred to as a canister loading conduit 278. In this way, the vacuum pump conduit 294 (interchangeably referred to herein as vacuum conduit 294) may be used to route fluid flow around FTIV 252, for example, while FTIV 252 is closed. The combination of the conduit 271 and the canister loading conduit 278 may be an example of a first conduit configured to fluidly couple the fuel tank 220 to the canister 222. The vacuum conduit 294 may be a second conduit configured to fluidly couple the fuel tank to the canister 222. Additionally or alternatively, the vacuum conduit 294 may be configured to bypass the FTIV 252.

A pipe corresponding to the vacuum conduit 294 may comprise a diameter larger than the diameters of pipes corresponding to the conduit 271 and the canister loading conduit 278. Said another way, the diameter of the vacuum conduit 294 between the vacuum pump 289 and tank pressure control (TPC) valve 292 may be larger than other conduits of the fuel system. As will be discussed in greater detail below, the larger diameter may allow for a larger vacuum to be drawn via vacuum pump 289 on TPC valve 292, for reasons that will be made more apparent from the discussion below. The diameter of the vacuum conduit 294 may be 1.5 times larger, 2 times larger, 2.5 times larger, 3 times larger, etc., than the diameter of the conduit 271 and the canister loading conduit 278. By increasing the diameter of the vacuum conduit, an amount of vacuum that the vacuum pump can establish in the fuel system and/or evaporative emissions system may be increased as compared to a situation where the diameter of the vacuum conduit 294 is not larger than the conduit 271 or the canister loading conduit 278.

The vacuum conduit 294 houses each of the vacuum pump 289 and the TPC valve 292. The vacuum pump 289 may be arranged downstream of the TPC valve 292 relative to a direction of fuel vapor flow from the fuel tank 220 to the canister 222. In one example, the vacuum pump 289 is arranged as far as possible from TPC valve 292, so as to maximize a distance between vacuum pump 289 and TPC valve 292. To accomplish this, the vacuum pump 289 may be arranged proximally to the canister loading conduit 278 and the TPC valve 292 may be arranged proximally to the conduit 271. In one example, an outlet port of the vacuum pump 289 may be directly fluidly coupled to the canister loading conduit 278. In this way, the TPC valve 292 is arranged proximally to a first extreme end of the vacuum conduit 294 and the vacuum pump 289 is arranged proximally to a second extreme end of the vacuum conduit 294.

In some examples, a bladder may be configured to stem from vacuum conduit 294, such that when TPC valve 292 is closed, there may be opportunity to pull a larger amount of vacuum via vacuum pump 289 than would otherwise be possible if the bladder were not included.

When the vacuum pump 289 is activated, a vacuum may be drawn on the vacuum conduit 294 and TPC valve 292 when the TPC valve 292 is closed. The vacuum generated in the vacuum conduit 294 may be used to generate a vacuum in the vent line 227, as discussed below. For example, with the vacuum pump 289 operating to generate vacuum on the vacuum conduit 294, the CVV 297 may be actuated to an open position, wherein air from the vacuum conduit 294 is expelled to an ambient atmosphere via action of the vacuum pump. Then, in response to vacuum generated in the vacuum conduit 294 being greater than or equal to an initial threshold vacuum, which may be sensed via pressure sensor 284, the vacuum pump 289 may be switched off and CVV 297 may be commanded closed. It may be understood that the CPV 261 may be closed while the vacuum pump 289 is operating to allow the purge line 228, as well as when the vacuum pump is shut off and the CVV commanded closed. With the CVV closed and the vacuum pump 289 turned off, the initial vacuum may distribute or equilibrate within the evaporative emissions system, to an equilibrated threshold vacuum which may be understood to comprise a starting vacuum level for the equilibrated system for conducting a bleed-up portion of an evaporative emissions test diagnostic procedure. Thus, it may be understood that the initial threshold vacuum may be greater (e.g. more negative with respect to atmospheric pressure), than the equilibrated threshold vacuum. Said another way, the initial vacuum generated in the vacuum conduit 294 may be used to equilibrate the sealed evaporative emissions system to the equilibrated threshold vacuum as the established vacuum in vacuum conduit 294 leaks through vanes of the vacuum pump 289 to other aspects of the sealed evaporative emissions system including vent line 227, purge line 228, and canister loading conduit 278. In this way, the vacuum level in the vacuum conduit 294 may increase to the equilibrated threshold vacuum, which is a weaker vacuum (e.g., less negative) than the initial threshold vacuum, and this equilibrated vacuum may be used as a starting vacuum for conducting the pressure bleed-up portion of the evaporative emissions test diagnostic, discussed in further detail below. Pressure sensor 284 may in some examples be used to monitor vacuum development in vacuum conduit 294 under conditions where TPC valve 292 is closed and vacuum pump 289 is activated.

When TPC valve 292 is open and the diagnostic test include monitoring leaks in the fuel tank 220, pressure sensor 296 may be used additionally or alternatively to pressure sensor 284.

It may be understood that vacuum pump 289 may not include a reference orifice for establishing thresholds vacuum build and/or bleed-up thresholds, thus calibrations may be utilized in order to determine such thresholds. For example, there may be a 3D lookup table stored in memory of the controller, which may enable determination of thresholds as a function of ambient temperature and fuel level. In this way, use of a reference orifice may be avoided.

As discussed, CVV 297 may function to adjust a flow of air and vapors between canister 222 and the atmosphere, and may be controlled during or prior to diagnostic routines. For example, the CVV 297 may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In the example vehicle system 206, the configuration of the vacuum pump 289 positioned in vacuum pump conduit 294 may allow for purging operations and refueling operations to be conducted with reduced reliance on an intake manifold vacuum. That is to say, a combination of the vacuum pump 298 and the TPC valve 292 may be used to depressurize the fuel tank 220 more quickly compared to previous examples with a vacuum pump arranged in a different location, such as branched off of the vent line 227.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Thus, one example of a test diagnostic for determining a presence or absence of undesired evaporative emissions using vacuum pump 289 may comprise opening the CVV 297, and activating the vacuum pump to evacuate the evaporative emissions system with the FTIV 252 closed. The TPC valve 292 may be maintained fully closed during the evacuation, such that after the initial threshold vacuum is reached (indicating an absence of non-gross undesired evaporative emissions), the vacuum pump may be commanded off, and the CVV may be commanded closed. Then, the initial threshold vacuum may decay or reduce to the equilibrated threshold vacuum, due to the negative pressure in the vacuum conduit 294 equilibrating to the other aspects of the evaporative emissions system (e.g. vent line 227 at FIG. 2) through the vanes, for example, of vacuum pump 289. Once the equilibrated threshold vacuum is established, then pressure bleed-up may be monitored to assess presence or absence of undesired evaporative emissions stemming from the evaporative emissions system. For example, if pressure bleed-up remains below a pressure bleed-up threshold, or if a pressure bleed-up rate is less than a pressure bleed-up rate threshold, an absence of non-gross undesired evaporative emissions in the evaporative emissions system may be indicated. By initially evacuating the vacuum conduit 294 with the TPC valve closed, it may be understood that the test diagnostic may be on the evaporative emissions system, and not the fuel system.

In another example, the vacuum pump may be activated with TPC valve 292 commanded fully open, and with the CVV open. Upon the initial threshold vacuum being reached, then the CVV may be commanded closed so that the initial threshold vacuum equilibrates to the equilibrated threshold vacuum in both the fuel system and the evaporative emissions system together. Then, pressure bleed-up may be monitored for the fluidly coupled fuel system and evaporative emissions system, to ascertain presence or absence of undesired evaporative emissions stemming from both the fuel system and the evaporative emissions system, in similar fashion as that discussed above.

In another example, the vacuum pump 289 may be utilized to evacuate the fuel system, with the TPC valve 292 open (e.g. actuated open via a command from the controller), for conducting an evaporative emissions system diagnostic on the fuel system alone. For example, in response to a threshold vacuum being reached (monitored via either pressure sensor 282 or fuel tank pressure transducer 291), which may be equal to the equilibrated threshold vacuum or different than the equilibrated threshold vacuum, then an absence of gross undesired evaporative emissions may be indicated. Responsive to the indication of the absence of gross undesired evaporative emissions stemming from the fuel system, the fuel system may be sealed via commanding closed the FTIV 252 and the TPC valve 292 (e.g. actuating closed the FTIV and the TPC valve via a command from the controller), and pressure bleed-up in the fuel system may be monitored. Responsive to an indication that pressure bleed-up is less than a pressure bleed-up threshold, or if a pressure bleed-up rate is less than a pressure bleed-up rate threshold, an absence of non-gross undesired evaporative emissions in the fuel system may be indicated (provided that the evaporative emissions system is known to be free from undesired evaporative emissions).

Thus, discussed above are a few examples of how a test for undesired evaporative emissions may be conducted on a vehicle system that includes vacuum pump 289 positioned in conduit 294 that includes TPC valve 292. As discussed, an advantage of placing the pump in conduit 294 is that the vacuum pump may avoid having to include check valves and a reference orifice, which may reduce weight, improve packaging constraints, reduce costs, etc. Another advantage is an ability to activate the vacuum pump to depressurize the fuel tank under conditions where fuel tank depressurization is requested, for example, via the controller of the vehicle. More specifically, in response to a pressure build in the fuel tank greater than a threshold, the TPC valve may be commanded open or duty cycled at a rate dependent on the pressure, and the vacuum pump may be activated to assist in the fuel tank depressurization. Without such an assist, fuel tank depressurization may be slow, and the fuel tank vapors may not be effectively routed to the canister and/or to engine intake. Activating the vacuum pump to draw the fuel vapors from the fuel tank and route them to the canister and/or engine intake may improve fuel tank depressurization routines. Briefly, such a method may include in response to fuel tank pressure greater than the threshold fuel tank pressure, commanding open (or duty cycling) the TPC valve, and activating the vacuum pump to draw vacuum on the fuel tank. Then, when pressure in the fuel tank is either below the threshold pressure or below another threshold pressure that is closer to atmospheric pressure than the threshold pressure, the vacuum pump may be deactivated and the TPC valve commanded closed. During the depressurization routine it may be understood that the FTIV may be maintained closed.

Furthermore, by including the vacuum pump in the conduit that includes the TPC valve, fuel tank refueling operations may be conducted without having to route fuel vapors past the vacuum pump. For example, in response to a refueling request, the FTIV may be commanded open and any fuel tank vapors generated during refueling may be routed to the canister through the FTIV, without having to go through the restrictive vacuum pump. Including the FTIV and the TPC valve in parallel, where the conduit that includes the TPC valve also includes the vacuum pump, may enable refueling operations to proceed without premature shutoffs of a refueling dispenser during refueling, which may otherwise occur if fuel vapors had to pass through the vacuum pump during refueling.

Turning now to FIG. 3, it shows a method 300 for executing a vacuum-based diagnostic for undesired evaporative emissions stemming from a vehicle fuel system and/or evaporative emissions system, is shown. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The valves described with respect to FIG. 2 and the method 300 of FIG. 3 may each comprise actuators configured to receive a signal from a controller, such as controller 212 of FIG. 2, wherein the signal may instruct the actuator to move a moveable portion of the valve to a desired (e.g., commanded position).

The method 300 begins at 304, which includes activating the vacuum pump to initiate the diagnostic test. As such, the vacuum pump may begin to generate a vacuum in at least the vacuum pump conduit. It may be understood that prior to step 304, the controller determines that conditions are met for conducting such a diagnostic test. Conditions being met may include an indication of a potential for presence of undesired evaporative emissions stemming from the fuel tank and/or evaporative emissions system, a threshold duration of time elapsing since a prior evaporative emissions test diagnostic was conducted, an engine-off condition, etc.

In some examples of the diagnostic test, it may be desired to conduct a test diagnostic on the fuel system and evaporative emissions system together. In such an example, the TPC valve may be opened, and the FTIV may be closed to allow vacuum generated via operation of the vacuum pump (e.g., vacuum pump 289 at FIG. 2) to evacuate the fuel tank (e.g., fuel tank 220 of FIG. 2).

In other examples, it may be desirable to determine if undesired evaporative emissions are present in the evaporative leak system and not the fuel system. In such an event, the TPC may be actuated to a fully closed position, such that vacuum generated via operation of the vacuum pump may not extend to the fuel tank.

The method 300 proceeds to 306, which includes commanding open or maintaining open the CVV. By opening the CVV, air in the vacuum conduit may be expelled to the vent line and to the ambient atmosphere. Vacuum may be generated in the vacuum conduit between the TPC valve and the vacuum pump if the TPC valve is in a closed position and it is desired to determine if a leak is present in the evaporative emissions system. Alternatively, vacuum may be generated in each of the vacuum conduit and the fuel tank by opening the TPC valve if it is desired to monitor for undesired evaporative emission in the fuel tank and the evaporative emissions system. In either case, it may be understood that the FTIV may be commanded closed. Additionally or alternatively, the purge valve of the purge line may be commanded closed.

The method 300 may proceed to 308, which includes determining if a vacuum generated is greater than an initial threshold. The vacuum generated may be sensed by pressure sensor 284 and/or pressure sensor 296 of FIG. 2. The initial threshold may be equal to a vacuum stronger than a vacuum of an equilibration threshold. For example, if the equilibration threshold is $-8$ inH$_2$O, then the initial threshold may be equal to $-16$ inH$_2$O. Thus, in some examples, the vacuum strength of the initial threshold may be twice as strong as the vacuum strength of the equilibration threshold. However, the initial threshold may be less than twice as strong as the vacuum corresponding to the equilibration threshold, or may be greater than twice as strong as the vacuum corresponding to the equilibration threshold, without departing from the scope of this disclosure. It may be understood that the value of the initial threshold is a value which, upon commanding closed the CVV after the initial threshold is reached, the sealed system (e.g. evaporative emissions system alone or both the fuel system and evaporative emissions system) equilibrate to the desired equilibration threshold for commencing the bleed-up portion of the evaporative emissions test diagnostic procedure. In this way, the initial vacuum is larger than a vacuum desired to conduct the bleed-up test.

In some examples, additionally or alternatively, the initial threshold vacuum may be a dynamic value, wherein the initial threshold vacuum may comprise a first value when a leak in the evaporative emissions system is being tested for, but not when both the fuel system and the evaporative emissions system are being tested for presence/absence of leaks. For example, the first value may be independent of fuel system temperature, pressure, etc., because the TPC valve is closed during operation of the vacuum pump. The initial threshold vacuum may comprise a second value when the evaporative emissions system and the fuel tank are being tested together. The second value may be a function of one or more of fuel system pressure and temperature, because the TPV valve is open during operation of the vacuum pump.

In one example, the first value may be greater (e.g. larger or stronger vacuum) than the second value due to the volume of the vacuum conduit when the TPC valve is closed being less than the volume of the combination of the vacuum conduit and the fuel tank when the TPC valve is open. In other words, because the volume of space that the vacuum pump evacuates (e.g., vacuum conduit 294 at FIG. 2) is less when the TPC valve is commanded closed as compared to when the TPC valve is open (e.g., vacuum conduit 294, conduit 271, and fuel tank 220 of FIG. 2), the initial threshold vacuum may be larger when the volume of space is smaller, so as to enable equilibration to the equilibration threshold in each case (e.g., TPV valve open or closed during evacuation).

If the vacuum is less than the initial threshold, then the method 300 proceeds to 310 to determine if a threshold duration has elapsed. The threshold duration may be based on an amount of time expected for the vacuum pump to decrease the pressure of the vacuum conduit and/or the fuel tank to the initial threshold. The threshold duration may be an adjustable value, wherein a first threshold duration may correspond to an expected amount of time needed to decrease the pressure in response to the diagnostic test occurring when the TPC valve is moved to a closed position. A second threshold duration, which may be longer than the first threshold duration, may correspond to an expected amount of time needed to decrease the pressure in the vacuum conduit and the fuel tank in response to the diagnostic test occurring when the TPC valve is open. Thus, the second threshold duration may be greater than the first threshold duration due to the vacuum pump generating a vacuum in a larger volume of the fuel system. At any rate, if the threshold duration has not elapsed, then the method 300 proceeds to 312, which may include continuing generating vacuum.

If the threshold duration has elapsed and the vacuum is less than the initial threshold, then the method 300 proceeds to 314 to indicate a degradation. The degradation may include a gross leak, or in other words presence of a source of gross undesired evaporative emissions stemming from the vacuum conduit between the vacuum pump and the TPC valve. Additionally or alternatively, the TPC valve may be degraded, wherein the degradation may include that the TPC valve may not fully close.

In one example, to determine if the TPC valve is degraded, the method 300 may include extending to the vacuum to the fuel tank (without commanding open the TPC valve) to see if the vacuum conduit and the fuel tank may reach the second value of the initial threshold vacuum. If the fuel tank and vacuum conduit do reach the second value, then the TPC valve may be degraded and unable to fully close. If the fuel tank and the vacuum conduit are unable to reach the second value, then there may be a leak in the vacuum conduit and/or the fuel tank.

Whether the degradation is indicated to be in the vacuum conduit or due to the TPC valve being unable to effectively seal, method 300 proceeds to 316, to relieve the vacuum, which may include shutting off the vacuum pump, and maintaining open the CVV to allow the vacuum conduit 294 to return to ambient pressure (e.g., atmospheric pressure). The TPC (if opened) may be commanded closed responsive to pressure in the fuel system and/or evaporative emissions system reaching atmospheric pressure.

The method 300 may proceed to 318, which may include adjusting vehicle operating parameters. In one example, adjusting vehicle operating parameters may include activating an indicator lamp to alert the vehicle operator that service is desired for either the gross undesired evaporative emission or for the degraded TPC valve.

Returning to 308, if the vacuum is greater than or equal to the initial threshold and a gross undesired evaporative emission is absent, then the method 300 proceeds to 320, which may include deactivating the vacuum pump followed by closing the CVV at 322. The method 300 proceeds to 324, which include equilibrating pressure in the remaining aspects of the evaporative emissions system (e.g., the canister and the vent line) with the vacuum generated in the vacuum conduit. This may include flowing vacuum from the vacuum conduit, through vanes of the deactivated vacuum pump, and to the vent line up until the closed CVV. Additionally, the vacuum may flow to the canister loading line between the FTIV and the canister and to the purge line between the purge valve and the canister. In this way, a vacuum of the vacuum conduit may equilibrate with the evaporative emissions system, such that a pressure of the vacuum conduit (and fuel tank in cases where the TPC valve was opened for the evacuating) increases (e.g., becomes a weaker vacuum) and a pressure of the remainder of the evaporative emissions system (e.g., canister and vent line) decreases (e.g., becomes a stronger vacuum) until pressure throughout the fuel system and/or evaporative emissions system is equal at the equilibrated vacuum threshold.

The method 300 proceeds to 326 to determine if the equilibrated vacuum is greater than or equal to the equilibration threshold. Said another way, the method may determine if a pressure is less than or equal to an equilibration threshold. If the vacuum is less than the equilibration threshold, then the method 300 may proceed to 327 to maintain the vacuum pump active until the equilibration threshold is reached.

If the vacuum is greater than or equal to the equilibration threshold, then the method 300 proceeds to 328, which may include indicating monitoring a bleed-up rate. The bleed-up rate may correspond to a rate of pressure increase to atmospheric pressure in one or more of the vent line, purge line, canister loading conduit, and fuel tank. The method 300 proceeds to 330 to determine if the bleed-up rate is greater than a threshold bleed-up rate. If the bleed-up rate is less than or equal to the threshold bleed-up rate, then the method 300 proceeds to 332, which includes indicating the absence of a non-gross emission leak. Additionally, maintenance may not be desired following 332.

If the bleed-up rate is greater than the threshold bleed-up rate, then the method 300 proceeds to 334, which includes indicating a leak is present. The method may proceed to 318 to update vehicle operating parameters, which may include activating an indicator lamp to request maintenance for the non-gross emission leak.

Turning now to FIG. 4, it shows a graph 400 illustrating a prophetic operating sequence for an engine, such as the engine shown in FIGS. 1 and 2, executing a diagnostic test, such as the diagnostic test described in method 300 of FIG. 3. Plot 405 illustrates a vacuum pump status, plot 410 illustrates a CVV status, plot 415 illustrates a TPC valve status, plot 420 illustrates a FTIV status, plot 425 illustrates a vacuum conduit pressure, dashed line 430 illustrates an equilibration threshold, dashed line 435 illustrates an initial threshold, plot 440 illustrates a vent line pressure, dashed line 445 illustrates the equilibration threshold, dashed line 450 illustrates the initial threshold, and plot 455 illustrates the presence or absence of an undesired emission. The initial threshold corresponds to a lower pressure than the equilibration threshold, thereby indicating a vacuum strength of the initial threshold being greater than the equilibration threshold. Additionally or alternatively, the vent line pressure may be indicative of a purge line pressure and a canister loading conduit pressure. As described above and will be described below, the purge line and the canister loading conduit equilibrate with the vacuum conduit in a manner similar to the vent line. As such, the pressures of the different lines may be similar during the diagnostic test. Time increases from a left to a right side of the figure.

Prior to t1, the diagnostic is not initiated and the vacuum pump is off (plot 405). The CVV (plot 410) is open while each of the TPC valve (plot 415) and the FTIV (plot 420) are closed. The vacuum conduit pressure (plot 425) and the vent line pressure (plot 440) are both greater than the initial threshold (dashed lines 430 and 440), respectively. In one example, each of the conduit pressure and the vent line pressure are substantially equal to an ambient pressure. Presence of undesired emissions is not detected (plot 455).

At t1, the diagnostic test is initiated and the vacuum pump is activated (e.g., ON) and the CVV is maintained in the open position. Between t1 and t2, the vacuum conduit pressure begins to decrease toward the equilibration threshold.

At t2, the vacuum conduit pressure is less than the equilibration threshold and greater than the initial threshold. As such, the CVV remains open and the vacuum pump remains active. After t2 and prior to t3, the vacuum conduit pressure continues to decrease toward the initial threshold (dashed line 435).

At t3, the vacuum conduit pressure is equal to the initial threshold. In response, the vacuum pump is deactivated (e.g., OFF) and the CVV is commanded to a closed position. Between t3 and t4, the vacuum conduit pressure begins to increase toward ambient and the vent line pressure begins to decrease toward a negative pressure, such as the equilibration threshold, as the vacuum from the vacuum conduit flows to the vent line (e.g., and the purge line and canister loading conduit). In this way, the pressures of the vacuum conduit and the vent line may equilibrate, along with the purge line and the canister loading conduit.

At t4, the vent line pressure decreases to a pressure equal to the equilibration threshold and the vacuum conduit pressure is equal to the equilibration threshold. As such, an undesired gross emission may not be detected. Between t4 and t5, the CVV is maintained closed and the bleed-up test is conducted to determine if a non-gross undesired emission is present. As such, the pressures of the vent line and the vacuum conduit are allowed to slowly increase toward the ambient pressure. In the example of FIG. 4, the bleed-up (refer to plots 425 and 440) is less than the bleed-up threshold (represented by line 426) and a source of undesired emissions is not detected.

At t5, the CVV is commanded open to exit the diagnostic test and couple the vent line to ambient. After t5, the vent line pressure and the vacuum conduit pressures remain equal to ambient.

Turning now to FIG. 5, it shows a method 500 for activating the vacuum pump to depressurize the fuel tank in response to a fuel tank pressure being greater than a threshold fuel tank pressure and/or in response to a refueling request being present. The method 500 begins at 502, which includes determining if a fuel tank pressure is greater than a threshold fuel tank pressure. The threshold fuel tank pressure may be based on a single tank pressure or a desired tank pressure range. Such a step may occur while the vehicle is in operation, in an example. In one example, the threshold fuel tank pressure is an upper limit pressure of the fuel tank, wherein fuel tank pressure greater than the threshold fuel tank pressure may signal a desire to depressurize the fuel tank.

If the fuel tank pressure is greater than the threshold fuel tank pressure, then the method 500 proceeds to 504 to activate the vacuum pump to draw a negative pressure with respect to atmospheric pressure on the fuel tank. The method 500 proceeds to 506, which includes opening the TPC valve, or duty cycling the TPC valve as a function of pressure in the fuel tank, level of intake manifold vacuum, ambient temperature, etc. Controlling the TPC valve may include a signal sent from a controller to an actuator of the TPC valve to command the TPC valve open. In some examples, the TPC valve may be opened prior to activating the vacuum pump.

The method 500 proceeds to 508, which includes depressurizing the fuel tank until a desired pressure is reached. In one example, the desired pressure may be less than or equal to the threshold fuel tank pressure. In another example, the desired pressure may be equal to a lower limit pressure, which may correspond to a lowest desired pressure of the fuel tank. For example, the desired pressure may be atmospheric pressure. Once the desired pressure is achieved, the vacuum pump may be deactivated and the valves may be returned to desired positions. Thus, it may be understood that during engine operating conditions where fuel tank pressure rises above the threshold fuel tank pressure, the TPC valve may be duty cycled to relieve the pressure and the vacuum pump may additionally be activated to reduce the fuel tank pressure in a manner quicker than would otherwise occur if the vacuum pump were not activated.

Returning to 502, if the fuel tank pressure is not greater than the threshold fuel tank pressure, then the method 500 proceeds to 512, which may include determining if a refueling request is present. The refueling request may be present if a vehicle is parked at a fuel station, in response to a vehicle operator depressing a refueling button signaling a request to refuel, if a fuel door is manually signaled to open, and the like. If the refueling request is present, then the method 500 may execute 504 to 508 as described above. The vacuum pump may be deactivated in response to the fuel tank reaching an ambient pressure. If the refueling request is not present, then the method 500 proceeds to 514, which may include maintaining current operating parameters and does not activate the vacuum pump.

Said another way, the vacuum pump may, in response to a refueling request, be commanded on to depressurize the fuel tank in a manner faster than that which would otherwise occur in the absence of vacuum pump activation. For example, the FTIV may be commanded open for a refueling event for vehicle systems that do not include the TPC valve or the vacuum pump positioned in the vacuum pump conduit that includes the TPC valve, and the opening of the FTIV may be what initiates depressurization of the fuel tank. However, there may be circumstances where such depressurization is slow, which can be frustrating to a vehicle operator. Such circumstances can include high ambient temperatures, high pressure in the fuel tank, etc. Thus, by activating the vacuum pump to draw fuel vapors from the fuel tank, fuel tank depressurization routines in response to refueling requests may be quicker relative to a vacuum pump positioned further away from the fuel tank, such as in a vent line. While not explicitly illustrated, the FTIV may be commanded open while the vacuum pump is operating, prior to the vacuum pump being activated, or in response to fuel tank pressure reaching the desired pressure. It may be understood that during refueling, fuel vapors may be directed through the FTIV, as the vacuum pump may be commanded off and the TPC valve may be commanded closed.

Turning now to FIGS. 6A and 6B, they show embodiments 600 and 650, respectively, undergoing a first example of the diagnostic test where the fuel tank is not evaluated for a leak (e.g. vacuum pump 289 activated with TPC valve 292 closed). Embodiment 600 illustrates the vacuum conduit 294 and the vent line 227 prior to an equilibration. Vacuum flow is illustrated via white arrow heads and air flow (e.g. positive pressure stemming from vacuum pump operation) is illustrated via black arrow heads. The vacuum pump 289 is active and applying vacuum to the vacuum conduit 294. As a result, air due to vacuum pump operation is pushed into the canister loading conduit 278, through the canister 222, through the vent line 227, through the CVV 297, and to an ambient atmosphere. The purge valve 261 and the FTIV 252 are closed in each of the embodiments 600 and 650. Once the vacuum conduit 294 reaches the initial threshold vacuum, which may be sensed by pressure sensor 284, as discussed above, then the vacuum pump 289 is deactivated and the CVV 297 is closed, as shown in embodiment 650. Vacuum from the vacuum conduit 294 equilibrates with each of the canister loading conduit 278, vent line 227, and purge line 228. As shown, air trapped in each of the purge line 228, vent line 227, and canister loading conduit 278 flows to the vacuum conduit 294 as they receive vacuum. In this way, the vacuum generated in the vacuum conduit 294 prior to the equilibration is stronger than (e.g., lower in pressure) than the equilibration vacuum achieved in embodiment 650.

Turning now to FIGS. 7A and 7B, they show embodiments 700 and 750, respectively, undergoing a second example of the diagnostic test wherein the fuel tank is evaluated for a leak. The second example may be substantially similar to the first example shown in FIGS. 6A and 6B, except that the second example further comprises adjusting a position of the TPC valve 292 to an open position so that vacuum may enter the fuel tank. Furthermore, the initial threshold in the second example may be a weaker vacuum (e.g., higher in pressure) than the initial threshold in the first example. In some examples, if the equilibration threshold is −8 in $H_2O$, then the initial threshold in the second example may be −12 in $H_2O$ and the initial threshold in the first example may be −16 in $H_2O$. The second example may need less vacuum due to a vacuum being drawn over a greater volume of the system. Similar to the embodiments 600 and 650, the purge valve 261 and the FTIV 252 are maintained in closed positions in embodiments 700 and 750.

In the embodiment 700, the CVV 297 is open and the TPC valve 292 is open. The vacuum pump 289 is active and flows vacuum through the vacuum conduit 294, the conduit 271, and into the fuel tank 220. As such, air flows from the fuel tank 220, through each of the conduit 271, the vacuum conduit 294, the canister loading conduit 278, the canister 222, and the vent line 227 as it flows to an ambient atmosphere via the open CVV 297.

The vacuum pump 289 may be deactivated in response to the system reaching the initial threshold, which may be sensed by pressure sensor 284 or pressure sensor 296. In the embodiment 750, the vacuum pump 289 is deactivated and the CVV 297 is closed to allow the system to reach equilibrium. As such, vacuum flows from through vanes of the vacuum pump 289 and into each of the canister loading conduit 278, the canister 222, the purge line 228, and the vent line 227. During the equilibration, pressures of each of the vent line 227, purge line 228, and the canister loading conduit 278 decrease, while a pressure of the fuel tank 220, conduit 271, and vacuum conduit 294 increases.

In this way, manufacturing costs for a fuel system of a hybrid vehicle may be reduced by arranging a vacuum pump in a vacuum conduit parallel to a fuel tank isolation conduit. The vacuum conduit may be shaped to bypass the fuel tank isolation valve in the fuel tank isolation conduit, wherein the vacuum pump may be activated in response to a manifold vacuum being too low, to conduct a diagnostic test and/or to depressurize the fuel tank. The technical effect of arranging the vacuum pump between a canister and the fuel tank in the vacuum conduit is to decrease manufacturing costs by arranging fewer valves in the fuel system while decreasing dependence on the manifold vacuum.

An embodiment of a system, comprises a first conduit fluidly coupling a fuel tank to a fuel vapor canister and a second conduit fluidly coupling the fuel tank to the fuel vapor canister, wherein the first conduit comprises a fuel tank isolation valve and the second conduit comprises a tank pressure control valve and a vacuum pump.

A first example of the system further includes where the fuel vapor canister is fluidly coupled to a vent line comprising a canister ventilation valve.

A second example of the system, optionally including the first example, further includes where a controller with computer-readable instructions stored thereon that when executed enable the controller to close the fuel tank isolation valve, activate the vacuum pump, and open the tank pressure control valve to depressurize the fuel tank.

A third example of the system, optionally including one or more of the previous examples, further includes where the instructions further enable the controller to activate the vacuum pump to initiate a diagnostic leak test of the fuel tank.

A third example of the system, optionally including one or more of the previous examples, further includes where the fuel tank is arranged on a hybrid vehicle.

An another representation, an embodiment of a hybrid vehicle, comprises a fuel tank fluidly coupled to a fuel vapor canister via a first conduit comprising a fuel tank isolation valve and via a second conduit comprising a vacuum pump and a controller with computer-readable instructions stored on non-transitory memory thereof that when executed enable the controller to activate the vacuum pump, close the fuel tank isolation valve, and open a canister vent valve to conduct a diagnostic test.

A first example of the hybrid vehicle further comprises where the canister vent valve is arranged in a vent line fluidly coupling the fuel vapor canister to an ambient atmosphere.

A second example of the hybrid vehicle, optionally including the first example, further comprises where the second conduit further comprises a tank pressure control valve arranged between the fuel tank and the vacuum pump.

A third example of the hybrid vehicle, optionally including one or more of the previous examples, further comprises where the instructions further enable the controller to deactivate the vacuum pump and close the canister vent valve in response to a vacuum generated between the vacuum pump and the tank pressure control valve being greater than or equal to an initial threshold.

A fourth example of the hybrid vehicle, optionally including one or more of the previous examples, further comprises where the second conduit is shaped to flow vacuum through vacuum pump that is deactivated to the vent line to equilibrate the vent line with the second conduit.

A fifth example of the hybrid vehicle, optionally including one or more of the previous examples, further comprises where the diagnostic test is a first diagnostic test, wherein the instructions further enable the controller to close the tank pressure control valve to block vacuum from flowing to the fuel tank.

A sixth example of the hybrid vehicle, optionally including one or more of the previous examples, further comprises where the diagnostic test is a second diagnostic test, wherein the instructions further enable the controller to open the tank pressure control valve to allow vacuum to flow to the fuel tank.

An embodiment of a fuel system for a hybrid vehicle, comprises a fuel tank comprising a first conduit selectively fluidly coupling the fuel tank to a fuel vapor canister, the first conduit comprising a fuel tank isolation valve, a second conduit selectively fluidly coupling the fuel tank to the fuel vapor canister, the second conduit arranged in parallel to the first conduit and shaped to bypass the fuel tank isolation valve, the second conduit comprising a vacuum pump and a tank pressure control valve, a vent line selectively fluidly coupling the fuel vapor canister to an ambient atmosphere, the vent line comprising a canister ventilation valve, and a controller with computer-readable instructions stored on non-transitory memory thereof that when executed enable the controller to activate the vacuum pump, close the tank pressure control valve, close the fuel tank isolation valve, and open the canister ventilation valve until an initial threshold vacuum is generated between the vacuum pump and the tank pressure control valve to conduct a diagnostic test.

A first example of the fuel system of the hybrid vehicle further comprises where the instructions further enable the controller to deactivate the vacuum pump and close the canister ventilation valve, wherein the vacuum pump is shaped to allow vacuum from the second conduit to flow to and equilibrate with the vent line to decrease a vacuum of the second conduit and increase a vacuum of the vent line to an equilibration threshold.

A second example of the fuel system of the hybrid vehicle, optionally including the first example, further comprises where the second conduit comprises an orifice size greater than an orifice size of the first conduit.

A third example of the fuel system of the hybrid vehicle, optionally including one or more of the previous examples, further comprises where the vacuum pump and the tank pressure control valve are arranged adjacent to opposite extreme ends of the second conduit.

A fourth example of the fuel system of the hybrid vehicle, optionally including one or more of the previous examples, further comprises where the instructions further enable the controller to activate the vacuum pump in response to a fuel tank pressure exceeding a threshold fuel tank pressure.

A fifth example of the fuel system of the hybrid vehicle, optionally including one or more of the previous examples, further comprises where the instructions further enable the controller to activate the vacuum pump in response to a refueling request being present.

A sixth example of the fuel system of the hybrid vehicle, optionally including one or more of the previous examples, further comprises where the instructions further enable the controller to indicate an undesired vapor emission being present in response to the initial threshold vacuum not being generated.

A seventh example of the fuel system of the hybrid vehicle, optionally including one or more of the previous examples, further comprises where the second conduit branches off the first conduit.

In another representation, a hybrid vehicle comprises a fuel tank selectively fluidly coupled to a fuel vapor canister via a first conduit comprising a FTIV and a second conduit comprising a vacuum pump and a TPC valve, wherein the second conduit is configured to bypass the FTIV and comprises a diameter larger than a diameter of the first conduit. A method for the hybrid vehicle comprises during a diagnostic test for determining emissions during a bleed-up conducted at a first vacuum load, activating the vacuum pump to increase a vacuum of the second conduit to a second vacuum load, wherein a vacuum of the second vacuum load is stronger than a vacuum of the first vacuum load, deactivating the vacuum pump in response to the vacuum of the second conduit being equal to the second vacuum load, closing a canister vent valve arranged in a vent line fluidly coupling the canister to an ambient atmosphere, equilibrating at least the vent line with the second conduit to the first vacuum load, and monitoring a bleed-up rate of the vent line in response to a vent line pressure being equal to the first vacuum load.

A first example of the method for the hybrid vehicle further comprises where a purge line and a canister loading conduit are equilibrated with the second conduit, wherein the purge line fluidly couples the canister to an intake passage of an engine when a purge valve is in an open position, and where the canister loading conduit corresponds to a portion of the first conduit arranged between the FTIV and the canister.

A second example of the method for the hybrid vehicle, optionally including the first example, further comprises where the TPC valve is closed when activating the vacuum pump, wherein vacuum does not flow to the fuel tank.

A third example of the method for the hybrid vehicle, optionally including one or more of the previous examples, further comprises where the TPC valve is open when activating the vacuum pump, wherein the vacuum does flow to the fuel tank.

In another representation, a method comprises conducting an evaporative emissions test diagnostic on a vehicle evaporative emissions system by activating a vacuum pump positioned in a tank pressure control conduit that couples a fuel tank to a fuel vapor storage canister, the tank pressure control conduit running parallel to a load conduit, the tank pressure control conduit including a tank pressure control valve and the load conduit including a fuel tank isolation valve; with the tank pressure control valve closed, drawing a first vacuum in the tank pressure control conduit, then deactivating the vacuum pump, sealing the evaporative emissions system and in response to the first vacuum decaying to a second vacuum, initiating a bleed-up portion of the evaporative emissions test diagnostic and indicating an absence of undesired evaporative emissions in response to a pressure bleed-up in the evaporative emissions system remaining below a pressure bleed-up threshold.

In such a method, the fuel tank isolation valve may be closed during the evaporative emissions test diagnostic.

In such a method, a canister vent valve positioned in a vent line stemming from the fuel vapor storage canister is commanded open during drawing the first vacuum in the tank pressure control conduit, and sealing the evaporative emissions system includes commanding closed the canister vent valve.

In such a method, the first vacuum is more negative with respect to atmospheric pressure than the second vacuum.

In such a method, a canister purge valve may be closed during the evaporative emissions test diagnostic.

In such a method, the first vacuum is drawn on a space between the vacuum pump and the tank pressure control valve while the vacuum pump is activated, and then in response to the vacuum pump being deactivated, the first vacuum decays to the second vacuum due to fluid flow through the vacuum pump such that pressure in the sealed evaporative emissions system equilibrates to the second vacuum.

An example of a system for a vehicle comprises a load conduit selectively coupled to a fuel vapor storage canister positioned in an evaporative emissions system via a fuel tank isolation valve, a tank pressure control conduit that stems from the load conduit at a first position between the fuel tank isolation valve and the fuel tank, and reconnects with the load conduit at a second position between the fuel tank isolation valve and the fuel vapor storage canister, the tank pressure control conduit including a tank pressure control valve and a vacuum pump that is positioned between the tank pressure control valve and the fuel vapor storage canister; and a controller with computer readable instructions stored on non-transitory memory that when executed, cause the controller to command closed the tank pressure control valve, activate the vacuum pump to draw a vacuum on the tank pressure control conduit, and responsive to a first vacuum level being reached, deactivate the vacuum pump, seal the evaporative emissions system from atmosphere, equilibrate the evaporative emissions system to a second vacuum level that is a result of the first vacuum level decaying to the second vacuum level in the evaporative emissions system; and in response to the second vacuum level being reached, monitoring a pressure bleed-up in the evaporative emissions system to indicate a presence or an absence of undesired evaporative emissions stemming from the evaporative emissions system.

In such a system, the controller stores further instructions to indicate an absence of undesired evaporative emissions responsive to a pressure in the evaporative emissions system remaining below a threshold pressure for a predetermined time duration.

In such a system, the controller stores further instructions to command closed the fuel tank isolation valve prior to activating the vacuum pump and maintaining the fuel tank isolation valve closed after sealing the evaporative emissions system for monitoring the pressure bleed-up.

In such a system, the system further comprises a canister purge valve positioned in a purge conduit between the fuel vapor storage canister and an engine, and where the controller stores further instructions to command closed the canister purge valve prior to activating the vacuum pump and maintaining the fuel tank isolation valve closed after sealing the evaporative emissions system for monitoring the pressure bleed-up.

In such a system, the system further comprises a canister vent valve positioned in a vent line between the fuel vapor storage canister and atmosphere, and where the controller stores further instructions to command closed the canister vent valve for sealing the evaporative emissions system.

In such a system, the load conduit is of a first diameter that is smaller than a second diameter of the tank pressure control conduit.

In such a system, the first vacuum level is of a greater magnitude (e.g. more negative with respect to atmospheric pressure) than the second vacuum level.

Another example of a method comprises in response to a fuel tank pressure greater than a threshold pressure, duty cycling a fuel tank pressure control valve positioned in a tank pressure control conduit, and activating a vacuum pump positioned in the tank pressure control conduit to draw a negative pressure on the fuel tank in order to increase a rate at which the fuel tank is depressurized.

In such a method, a speed at which the vacuum pump is operated is based on the fuel tank pressure.

In such a method, a duty cycle of the tank pressure control valve is based on the fuel tank pressure.

In such a method, a fuel tank isolation valve positioned in a load conduit is commanded closed or maintained closed while duty cycling the fuel tank pressure control valve.

In such a method, in response to fuel tank pressure dropping below another threshold pressure, the fuel tank pressure control valve is commanded closed and the vacuum pump is deactivated.

In such a method, the fuel tank pressure greater than the threshold pressure occurs during operation of the vehicle, with the engine either combusting air and fuel or with the engine off and the vehicle being propelled via electrical energy.

In yet another example of a method, a method comprises in response to a request for refueling, commanding open a fuel tank isolation valve positioned in a load conduit to depressurize a fuel tank to allow fuel to be delivered thereto, monitoring a rate at which the fuel tank is depressurizing, and in response to the rate being less than a threshold rate, commanding open a tank pressure control valve positioned in a tank pressure control conduit, the tank pressure control valve and the fuel tank isolation valve in parallel with each other, and activating a vacuum pump positioned in the tank pressure control conduit to assist in depressurizing the fuel tank.

In such a method, in response to pressure in the fuel tank being lower than a predetermined threshold pressure, deactivating the vacuum pump and commanding closed the tank pressure control valve.

In such a method, vapors generated during refueling are routed through the fuel tank isolation valve en route to a fuel vapor storage canister.

In yet another example of a method, a method comprises in response to a request for refueling, commanding open a tank pressure control valve positioned in a tank pressure control conduit, commanding closed a fuel tank isolation valve positioned in a load conduit, the tank pressure control valve and the fuel tank isolation valve in parallel with each other, and activating a vacuum pump positioned in the tank pressure control conduit to draw a negative pressure on a fuel tank through the open tank pressure control valve. In response to a pressure in the fuel tank being lower than a predetermined fuel tank pressure, the method includes deactivating the vacuum pump, commanding closed the tank pressure control valve, and commanding open the fuel tank isolation valve. Furthermore, in response to the pressure in the fuel tank being lower than the predetermined fuel tank pressure, unlocking a refueling lock to allow refueling of the fuel tank with fuel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
  a first conduit fluidly coupling a fuel tank to a fuel vapor canister and a second conduit fluidly coupling the fuel tank to the fuel vapor canister, wherein the first conduit includes a fuel tank isolation valve and the second conduit includes a tank pressure control valve and a vacuum pump; and
  a controller with computer-readable instructions stored thereon that when executed enable the controller to:
    close the fuel tank isolation valve;
    activate the vacuum pump to initiate a diagnostic leak test of the fuel tank; and
    open the tank pressure control valve to depressurize the fuel tank.

2. The system of claim 1, wherein the fuel vapor canister is fluidly coupled to a vent line that includes a canister ventilation valve.

3. The system of claim 1, wherein the fuel tank is arranged on a hybrid vehicle.

4. A hybrid vehicle, comprising:
  a fuel tank fluidly coupled to a fuel vapor canister via a first conduit comprising a fuel tank isolation valve and via a second conduit comprising a vacuum pump, wherein the second conduit further comprises a tank pressure control valve arranged between the fuel tank and the vacuum pump; and
  a controller with computer-readable instructions stored on non-transitory memory thereof that when executed enable the controller to:
    activate the vacuum pump;
    close the fuel tank isolation valve;
    open a canister vent valve to conduct a diagnostic test; and
    deactivate the vacuum pump and close the canister vent valve in response to a vacuum generated between the vacuum pump and the tank pressure control valve being greater than or equal to an initial threshold, wherein the second conduit is shaped to flow vacuum through the vacuum pump that is deactivated to a vent line to equilibrate the vent line with the second conduit.

5. The hybrid vehicle of claim 4, wherein the canister vent valve is arranged in the vent line fluidly coupling the fuel vapor canister to an ambient atmosphere.

6. The hybrid vehicle of claim 4, wherein the diagnostic test is a first diagnostic test, wherein the instructions further enable the controller to close the tank pressure control valve to block vacuum from flowing to the fuel tank.

7. The hybrid vehicle of claim 4, wherein the diagnostic test is a second diagnostic test, wherein the instructions further enable the controller to open the tank pressure control valve to allow vacuum to flow to the fuel tank.

8. A fuel system for a hybrid vehicle, comprising:
  a fuel tank comprising a first conduit selectively fluidly coupling the fuel tank to a fuel vapor canister, the first conduit comprising a fuel tank isolation valve;
  a second conduit selectively fluidly coupling the fuel tank to the fuel vapor canister, the second conduit arranged in parallel to the first conduit and configured to bypass the fuel tank isolation valve, the second conduit including a vacuum pump and a tank pressure control valve;
  a vent line selectively fluidly coupling the fuel vapor canister to an ambient atmosphere, the vent line comprising a canister ventilation valve; and
  a controller with computer-readable instructions stored on non-transitory memory thereof that when executed enable the controller to:
    activate the vacuum pump, close the tank pressure control valve, close the fuel tank isolation valve, and open the canister ventilation valve until an initial threshold vacuum is generated between the vacuum pump and the tank pressure control valve to conduct a diagnostic test.

9. The fuel system for the hybrid vehicle of claim 8, wherein the instructions further enable the controller to deactivate the vacuum pump and close the canister ventilation valve, wherein the vacuum pump is configured to allow vacuum from the second conduit to flow to and equilibrate with the vent line to decrease a vacuum of the second conduit and increase a vacuum of the vent line to an equilibration threshold.

10. The fuel system for the hybrid vehicle of claim 8, wherein the second conduit comprises a diameter greater than a diameter of the first conduit.

11. The fuel system for the hybrid vehicle of claim 8, wherein the vacuum pump and the tank pressure control valve are arranged adjacent to opposite extreme ends of the second conduit.

12. The fuel system for the hybrid vehicle of claim 8, wherein the instructions further enable the controller to activate the vacuum pump and open the tank pressure control valve in response to a fuel tank pressure exceeding a threshold fuel tank pressure.

13. The fuel system for the hybrid vehicle of claim 8, wherein the instructions further enable the controller to activate the vacuum pump and open the tank pressure control valve in response to a refueling request being present.

14. The fuel system for the hybrid vehicle of claim 8, wherein the canister is fluidly coupled to an intake passage of an engine via a purge line, the purge line comprising a purge valve.

15. The fuel system for the hybrid vehicle of claim 8, wherein the second conduit branches off the first conduit, and where the tank pressure control valve is arranged at a first extreme end of the second conduit between the fuel tank isolation valve and the fuel tank, wherein the vacuum pump is arranged at a second extreme end, opposite the first extreme end, of the second conduit between the fuel tank isolation valve and the canister.

* * * * *